(12) United States Patent
Van Nieuwstadt et al.

(10) Patent No.: US 8,359,840 B2
(45) Date of Patent: Jan. 29, 2013

(54) METHOD FOR ADJUSTING BOOST PRESSURE WHILE REGENERATING A PARTICULATE FILTER FOR A DIRECT INJECTION ENGINE

(75) Inventors: Michiel J. Van Nieuwstadt, Ann Arbor, MI (US); Helmut Hans Ruhland, Eschweiler (DE); Moritz Klaus Springer, Hagen (DE); Thomas Lorenz, Köln (DE); Georg Louven, Neuwied (DE); Jan Harmsen, Simpelveld (NL)

(73) Assignee: Ford Global Technologies, LLC, Dearborn, MI (US)

( * ) Notice: Subject to any disclaimer, the term of this patent is extended or adjusted under 35 U.S.C. 154(b) by 357 days.

(21) Appl. No.: 12/620,366

(22) Filed: Nov. 17, 2009

(65) Prior Publication Data

US 2011/0072803 A1    Mar. 31, 2011

Related U.S. Application Data

(66) Substitute for application No. 61/246,926, filed on Sep. 29, 2009.

(51) Int. Cl.
*F01N 3/22*    (2006.01)
(52) U.S. Cl. ............... 60/295; 60/274; 60/278; 60/280; 60/285; 60/290; 60/291; 60/297; 60/301; 60/311
(58) Field of Classification Search ............ 60/274, 60/278, 280, 285, 289, 290, 291, 295, 297, 60/299, 301, 311
See application file for complete search history.

(56) References Cited

U.S. PATENT DOCUMENTS

| 5,724,810 | A | * | 3/1998 | Hosoya et al. ............... 60/276 |
| 7,062,904 | B1 | | 6/2006 | Hu et al. |
| 7,167,792 | B1 | * | 1/2007 | Kolmanovsky et al. ...... 701/112 |
| 7,299,626 | B2 | | 11/2007 | Barasa et al. |
| 7,482,303 | B2 | | 1/2009 | Bosteels |
| 2003/0200745 | A1 | * | 10/2003 | van Nieuwstadt et al. ..... 60/295 |
| 2005/0019578 | A1 | | 1/2005 | Bosteels |
| 2006/0096281 | A1 | * | 5/2006 | Huang ........................... 60/297 |
| 2006/0179825 | A1 | | 8/2006 | Hu et al. |

(Continued)

FOREIGN PATENT DOCUMENTS

| EP | 0952323 | 10/1999 |
| EP | 1245817 | 10/2002 |

(Continued)

OTHER PUBLICATIONS

Hepburn, Jeffrey S. et al., "System and Method for Regenerating a Particulate Filter Accompanied by a Catalyst," U.S. Appl. No. 12/638,511, filed Dec. 15, 2009, 53 pages.

(Continued)

*Primary Examiner* — Thomas Denion
*Assistant Examiner* — Jorge Leon, Jr.
(74) *Attorney, Agent, or Firm* — Julia Voutyras; Alleman Hall McCoy Russell & Tuttle LLP (57) ABSTRACT

A method for regenerating a particulate filter is disclosed. In one example, oxygen is pumped from the intake system of a direct injection turbocharged gasoline engine to the exhaust system by a compressor. The oxygen is introduced to a particulate filter at a location upstream from the particulate filter and downstream of a three-way catalyst. The oxygen may be regulated in part by adjusting compressor boost pressure in response to a state of particulate filter regeneration. Further, in one embodiment, engine NOx can be controlled by EGR.

20 Claims, 5 Drawing Sheets

U.S. PATENT DOCUMENTS

| | | | |
|---|---|---|---|
| 2007/0079614 A1* | 4/2007 | Barbe et al. | 60/605.2 |
| 2007/0125075 A1* | 6/2007 | Zanini-Fisher et al. | 60/297 |
| 2007/0220873 A1* | 9/2007 | Bosteels | 60/299 |
| 2008/0022677 A1* | 1/2008 | Barbe et al. | 60/599 |
| 2009/0120071 A1 | 5/2009 | Gandhi et al. | |
| 2009/0193796 A1* | 8/2009 | Wei et al. | 60/297 |
| 2010/0043402 A1* | 2/2010 | Perry et al. | 60/285 |
| 2010/0275582 A1* | 11/2010 | Wada et al. | 60/276 |
| 2011/0041483 A1* | 2/2011 | Kapparos | 60/288 |

FOREIGN PATENT DOCUMENTS

| | | |
|---|---|---|
| EP | 1319811 | 6/2003 |
| JP | 2001263053 | 9/2001 |
| JP | 2001263130 | 9/2001 |
| JP | 2004232544 | 8/2004 |
| JP | 2004251230 | 9/2004 |
| JP | 2006161572 | 6/2006 |
| JP | 2007291980 | 11/2007 |
| JP | 2009030547 | 2/2009 |
| JP | 2009041386 | 2/2009 |
| JP | 2009079487 | 4/2009 |
| JP | 2009085054 | 4/2009 |
| JP | 2009228448 | 10/2009 |
| WO | 2008127755 | 10/2008 |

OTHER PUBLICATIONS

Hepburn, Jeffrey S. et al., "System and Method for Regenerating a Particulate Filter," U.S. Appl. No. 12/638,533, filed Dec. 15, 2009, 55 pages.

Ruhland, Helmut H. et al., "Method for Controlling Spark for Particulate Filter Regenerating," U.S. Appl. No. 12/638,555, filed Dec. 15, 2009, 52 pages.

Hubbard, Carolyn P. et al., "Fuel Control for Spark Ignited Engine Having a Particulate Filter System," U.S. Appl. No. 12/638,595, filed Dec. 15, 2009, 52 pages.

Hubbard, Carolyn P. et al., "Method for Controlling Fuel of a Spark Ignited Engine While Regenerating a Particulate Filter," U.S. Appl. No. 12/638,633, filed Dec. 15, 2009, 53 pages.

Ruona, William C. et al., "Gasoline Particulate Filter Regeneration and Diagnostics," U.S. Appl. No. 12/689,930, filed Jan. 19, 2010, 60 pages.

Bidner, David K. et al., "Particulate Filter Regeneration During Engine Shutdown," U.S. Appl. No. 12/629,743, filed Dec. 2, 2009, 41 pages.

Bidner, David K. et al., "Particulate Filter Regeneration During Engine Shutdown," U.S. Appl. No. 12/610,991, filed Nov. 2, 2009, 65 pages.

Bidner, David K. et al., "Particulate Filter Regeneration in an Engine," U.S. Appl. No. 12/611,002, filed Nov. 2, 2009, 64 pages.

Bidner, David K. et al., "Particulate Filter Regeneration in an Engine," U.S. Appl. No. 12/611,009, filed Nov. 2, 2009, 65 pages.

Bidner, David K. et al., "Particulate Filter Regeneration in an Engine Coupled to an Energy Conversion Device," U.S. Appl. No. 12/611,019, filed Nov. 2, 2009, 64 pages.

Bidner, David K. et al., "Particulate Filter Regeneration in an Engine," U.S. Appl. No. 12/611,027, filed Nov. 2, 2009, 52 pages.

Lupescu, Jason A. et al., "Exhaust Treatment System for Internal Combustion Engine," U.S. Appl. No. 12/579,618, filed Oct. 15, 2009, 57 pages.

Van Nieuwstadt, Michiel J., "Control of Exhaust Flow in an Engine Including a Particulate Filter," U.S. Appl. No. 12/648,833, filed Dec. 29, 2009, 38 pages.

Van Nieuwstadt, Michiel J., "Controlling Operation of Exhaust of an Engine Including a Particulate Filter," U.S. Appl. No. 12/648,839, filed Dec. 29, 2009, 38 pages.

Van Nieuwstadt, Michiel J. et al., "System and Method for Regenerating a Particulate Filter for a Direct Injection Engine," U.S. Appl. No. 12/620,354, filed Nov. 17, 2009, 47 pages.

This Field Intentionally Left Blank.

Van Nieuwstadt, Michiel J. et al., "System for Regenerating a Particulate Filter and Controlling EGR," U.S. Appl. No. 12/620,374, filed Nov. 17, 2009, 46 pages.

Kerns, James M. et al., "Method for Regenerating a Particulate Filter for a Boosted Direct Injection Engine," U.S. Appl. No. 12/620,386, filed Nov. 17, 2009, 46 pages.

* cited by examiner

METHOD FOR ADJUSTING BOOST PRESSURE WHILE REGENERATING A PARTICULATE FILTER FOR A DIRECT INJECTION ENGINE

CROSS-REFERENCE TO RELATED APPLICATIONS

This application claims priority from U.S. Provisional Patent Application No. 61/246,926, entitled "SYSTEM AND METHOD FOR REGENERATING A PARTICULATE FILTER FOR A DIRECT INJECTION ENGINE", filed Sep. 29, 2009, the disclosure of which is hereby incorporated by reference in its entirety and for all purposes.

TECHNICAL FIELD

The present application relates to the field of automotive emission control systems and methods.

BACKGROUND AND SUMMARY

Exhaust gas recirculation (EGR) has been used to lower emissions of internal combustion engines. Introducing EGR to engine cylinders can reduce engine pumping losses as well as formation of NOx. In WO2008/127755, a system is described having an EGR passage located downstream of a compressor on the intake side of an engine and upstream of a turbine on the exhaust side of the engine. The reference also describes a catalyst and particulate filter disposed in the exhaust system at a location downstream of the turbine. In one configuration, the reference describes flowing gases from a location downstream of the compressor at the intake side of the engine, to a location in the exhaust system upstream of the catalyst and particulate filter. Further, the reference describes adjusting the boost pressure when the pressure in the exhaust manifold is higher than the pressure in the intake manifold. The method may help to ensure flow from the intake manifold to the exhaust system, but the compressor may be operated such that the flow from the intake system to the exhaust system is low. Alternatively, the compressor may be operated such that a higher pressure than is desired such that engine fuel economy is reduced.

Recently, direct injection gasoline engines have been shown to improve engine performance and to reduce transient air-fuel disturbances that may be caused by fuel adhering to the intake manifold and ports of an engine. However, at higher engine speeds and higher engine loads, particulates may form in engine exhaust. Under some conditions, formation of the particulates may be related to the short amount of time between when fuel is injected to the cylinder and when combustion is initiated by a spark plug. Specifically, there may be only a short opportunity for the injected fuel to completely vaporize and form a homogeneous mixture before combustion is initiated. If a homogeneous air-fuel mixture is not formed in the cylinder before combustion is initiated, pockets of stratification may form, and soot may be produced by combusting rich areas within the cylinder air-fuel mixture. Particulate filters have been proposed as one way to reduce emissions of soot.

The inventors herein have developed a method for regenerating a particulate filter, comprising: operating a direct injection gasoline engine having intake and exhaust systems, at least one cylinder of said direct injection gasoline engine combusting a substantially stoichiometric air-fuel mixture; flowing gases from said intake system to said exhaust system at a location upstream of a particulate filter and downstream of a three-way catalyst; and adjusting boost pressure in response to at least a state of particulate filter regeneration.

By adjusting boost pressure in response to at least a state of particulate filter regeneration, boost pressure may be controlled such that there is sufficient flow between an intake system and an exhaust system without producing a shortage or excess of boost. In this way, a particulate filter may be regenerated with intake system gases without over or under boosting the engine. Further, the compressor boost pressure can be adjusted as the particulate filter regenerates to allow for changes in the rate of oxidation of material held by the filter so that matter held by the particulate filter is oxidized efficiently.

The present description may provide several advantages. Specifically, the approach may improve engine emissions by allowing a catalyst to operate in an efficient operating window while at the same time regenerating a particulate filter. Further, the present method allows boost to be adjusted such that under boost and over boost are reduced. Further still, the rate of particulate matter oxidation can be regulated by controlling the flow between the intake system and the exhaust system from feedback output from an oxygen sensor located downstream of the particulate filter and at least partially sensing oxidation of material held by the particulate filter.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION OF THE DEPICTED EMBODIMENTS

Figure 1:
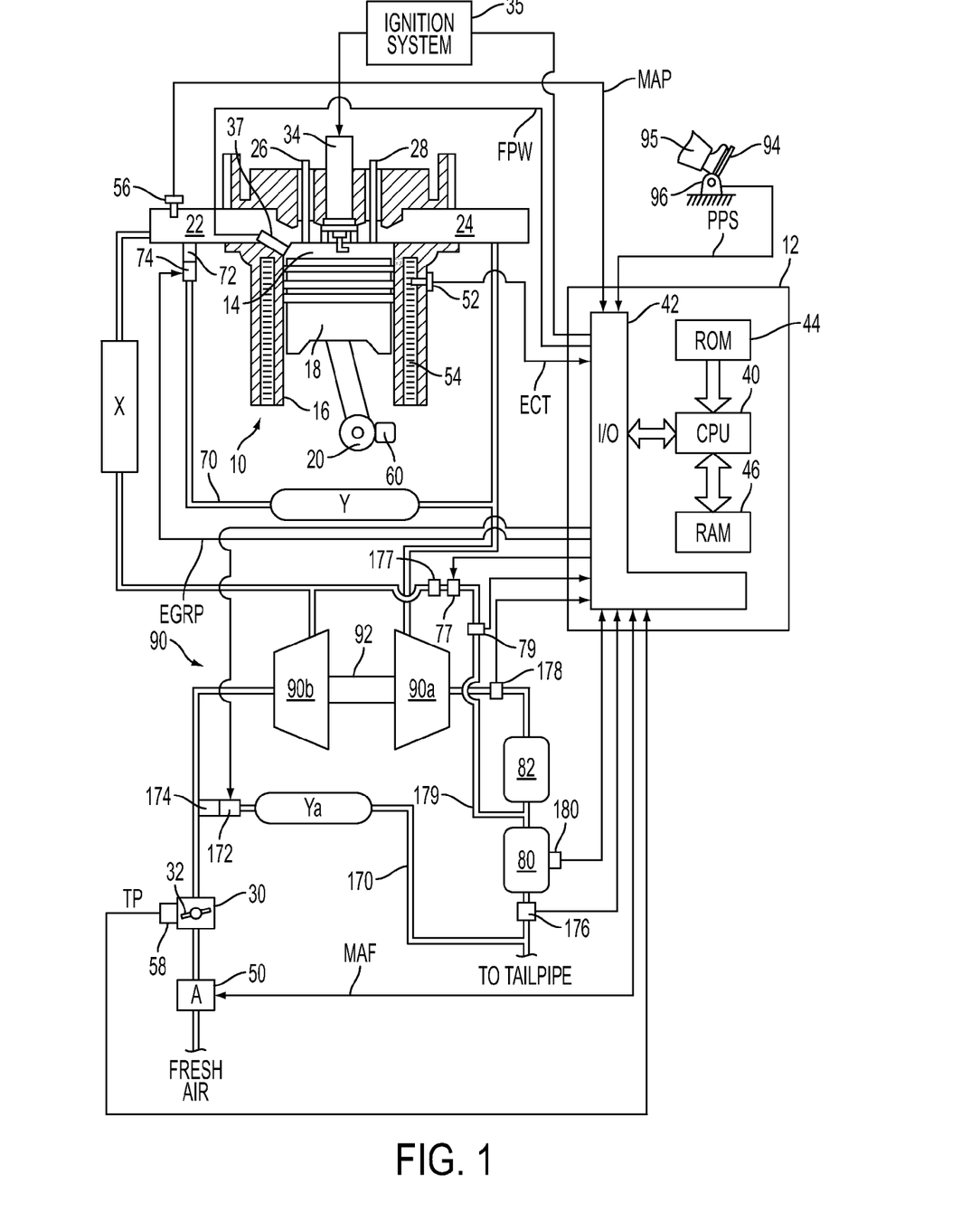
FIG. 1 shows a schematic view of an exemplary embodiment of a gasoline direct injection engine.

FIG. 1 shows an exemplary embodiment of a gasoline direct injection engine system generally at 10. Specifically, internal combustion engine 10 comprises a plurality of cylinders, one cylinder of which is shown in FIG. 1. Engine 10 is controlled by electronic engine controller 12. Engine 10 includes combustion chamber 14 and cylinder walls 16 with piston 18 positioned therein and connected to crankshaft 20. Combustion chamber 14 communicates with an intake manifold 22 and an exhaust manifold 24 via respective intake valve 26 and exhaust valve 28.

Intake manifold 22 communicates with throttle body 30 via throttle plate 32. In one embodiment, an electronically controlled throttle can be used. In one embodiment, the throttle is electronically controlled to periodically, or continuously, maintain a specified vacuum level in intake manifold 22. Note that throttle body 30 and throttle plate 32 may be located at a location downstream of compression device 90 in some applications. In a configuration where the throttle is downstream from the compression device, the tap for flowing intake system gases to the exhaust system may be located downstream of the compression device and upstream of the throttle. Alternatively, throttle body 30 and throttle plate 32 may be omitted.

Combustion chamber 14 is also shown having fuel injector 37 coupled thereto for delivering fuel in proportion to the pulse width of signal (fpw) from controller 12. Fuel is delivered to fuel injector 37 by a conventional fuel system (not shown) including a fuel tank, fuel pump, and fuel rail (not shown). In the case of direct injection engines, as shown in FIG. 1, a high pressure fuel system is used such as a common rail system.

For gasoline engine applications, spark plug 34 provides an ignition source for the contents of combustion chamber 14. Energy for creating a spark is provided by ignition system 35. Controller 12 adjusts the charging of ignition coils that provide voltage to spark plug 34. For diesel applications, spark plug 34 and ignition system 35 may be eliminated.

In the depicted embodiment, controller 12 is a conventional microcomputer, and includes a microprocessor unit 40, input/output ports 42, electronic memory 44, which may be an electronically programmable memory in this particular example, random access memory 46, and a conventional data bus.

Controller 12 receives various signals from sensors coupled to engine 10, including but not limited to: measurements of inducted mass airflow (MAF) from mass airflow sensor 50 coupled to the air filter [A on FIG. 1]; engine coolant temperature (ECT) from temperature sensor 52 coupled to cooling jacket 54; a measurement of manifold pressure (MAP) from manifold pressure sensor 56 coupled to intake manifold 22; a measurement of throttle position (TP) from throttle position sensor 58 coupled to throttle plate 32; and a profile ignition pickup signal (PIP) from Hall effect (or variable reluctance) sensor 60 coupled to crankshaft 20 indicating engine speed.

Engine 10 may include an exhaust gas recirculation (EGR) system to help lower NO and other emissions. For example, engine 10 may include a high pressure EGR system in which exhaust gas is delivered to intake manifold 22 by a high pressure EGR tube 70 communicating with exhaust manifold 24 at a location upstream of an exhaust turbine 90a of a compression device 90, and communicating with intake manifold 22 at a location downstream of an intake compressor 90b of compression device 90. The depicted high pressure EGR system includes high pressure EGR valve assembly 72 located in high pressure EGR tube 70. Exhaust gas travels from exhaust manifold 24 first through high pressure EGR valve assembly 72, and then to intake manifold 22. An EGR cooler [shown at Y in FIG. 1] may be located in high pressure EGR tube 70 to cool recirculated exhaust gases before entering the intake manifold. Cooling is typically done using engine water, but an air-to-air heat exchanger may also be used.

Engine 10 may also include a low pressure EGR system. The depicted low pressure EGR system includes a low pressure EGR tube 170 communicating with exhaust manifold 24 at a location downstream of exhaust turbine 90a, and communicating with intake manifold 22 at a location upstream of intake compressor 90b. A low pressure valve assembly 172 is located in low pressure EGR tube 170. Exhaust gas in the low pressure EGR loop travels from turbine 90a through a catalytic device 82 (for example, a three-way catalyst that may have a wash coat comprising platinum, palladium, and rhodium) and a particulate filter 80 before entering low pressure EGR tube 170. Catalytic device 82 processes engine exhaust gases to oxidize exhaust gas constituents, for example. A low pressure EGR cooler Ya may be positioned along low pressure EGR tube 170.

High pressure EGR valve assembly 72 and low pressure EGR valve assembly 172 each has a valve (not shown) for controlling a variable area restriction in high pressure EGR tube 70 and low pressure EGR tube 170, which thereby controls flow of high and low pressure EGR, respectively.

Particulate filter regeneration loop 179 is supplied pressurized air from compressor 90b. Pressurized air flows to a location in the exhaust system between catalyst 82 and particulate filter 80. Gases from the intake system may be provided from upstream of a throttle body or from downstream of a throttle body depending on system configuration. For example, if a compressor is located upstream of a throttle body, intake system gases can be driven from downstream of the compressor and upstream of the throttle body to the exhaust system. On the other hand, if the throttle body is located upstream of the compressor, intake system gases can be driven from downstream of the throttle body and upstream of the compressor to the exhaust system. In an alternative embodiment, an additional three-way catalyst may be positioned downstream of particulate filter 80. If desired, exhaust gases may be drawn through the particulate filter regeneration loop to the intake manifold during conditions when the engine is operating and when intake manifold is at a lower pressure than the exhaust system pressure between particulate filter 80 and catalyst 82.

Vacuum regulators 74, 174, and 177 are coupled to high pressure EGR valve assembly 72, low pressure EGR valve assembly 172, and particulate filter air supply valve assembly 77, respectively. Vacuum regulators 74, 174, 177 receive actuation signals from controller 12 for controlling the valve positions of high pressure EGR valve assembly 72, low pressure EGR valve assembly 172, and particulate filter supply valve assembly 77. In a preferred embodiment, high pressure EGR valve assembly 72 and low pressure EGR valve assembly 172 are vacuum actuated valves. However, any type of flow control valve or valves may be used such as, for example, an electrical solenoid powered valve or a stepper motor powered valve. Orifice and pressure sensor assembly 79 provide data that can be processed by controller 12 using Bernoulli's equation to determine flow between intake system and exhaust system when particulate filter air supply valve assembly 77 is in an open position.

Compression device 90 may be a turbocharger or any other such device. The depicted compression device 90 has a turbine 90a coupled in the exhaust manifold 24 and a compressor 90b coupled in the intake manifold 22 via an intercooler [shown at X in FIG. 1], which is typically an air-to-air heat exchanger, but could be water cooled. Turbine 90a is typically coupled to compressor 90b via a drive shaft 92. (This could also be a sequential turbocharger arrangement, single VGT, twin VGTs, or any other arrangement of turbochargers that could be used).

Concentration of oxygen present in the exhaust system may be assessed by oxygen sensors 178 and 176. Further, an additional oxygen sensor (not shown) may be placed between catalyst 82 and particulate filter 80. Oxygen sensor 178 senses engine feed-gas oxygen concentration while oxygen sensor 176 senses exhaust gas oxygen post-catalyst and post-particulate filter. Oxygen sensors may be wide range sensors having a linearized output or they may be sensors that indicate a high gain signal near stoichiometric conditions.

Further, drive pedal 94 is shown along with a driver's foot 95. Pedal position sensor (pps) 96 measures angular position of the driver actuated pedal.

It will be understood that the depicted engine 10 is shown only for the purpose of example and that the systems and methods described herein may be implemented in or applied to any other suitable engine having any suitable components and/or arrangement of components.

Figure 2:
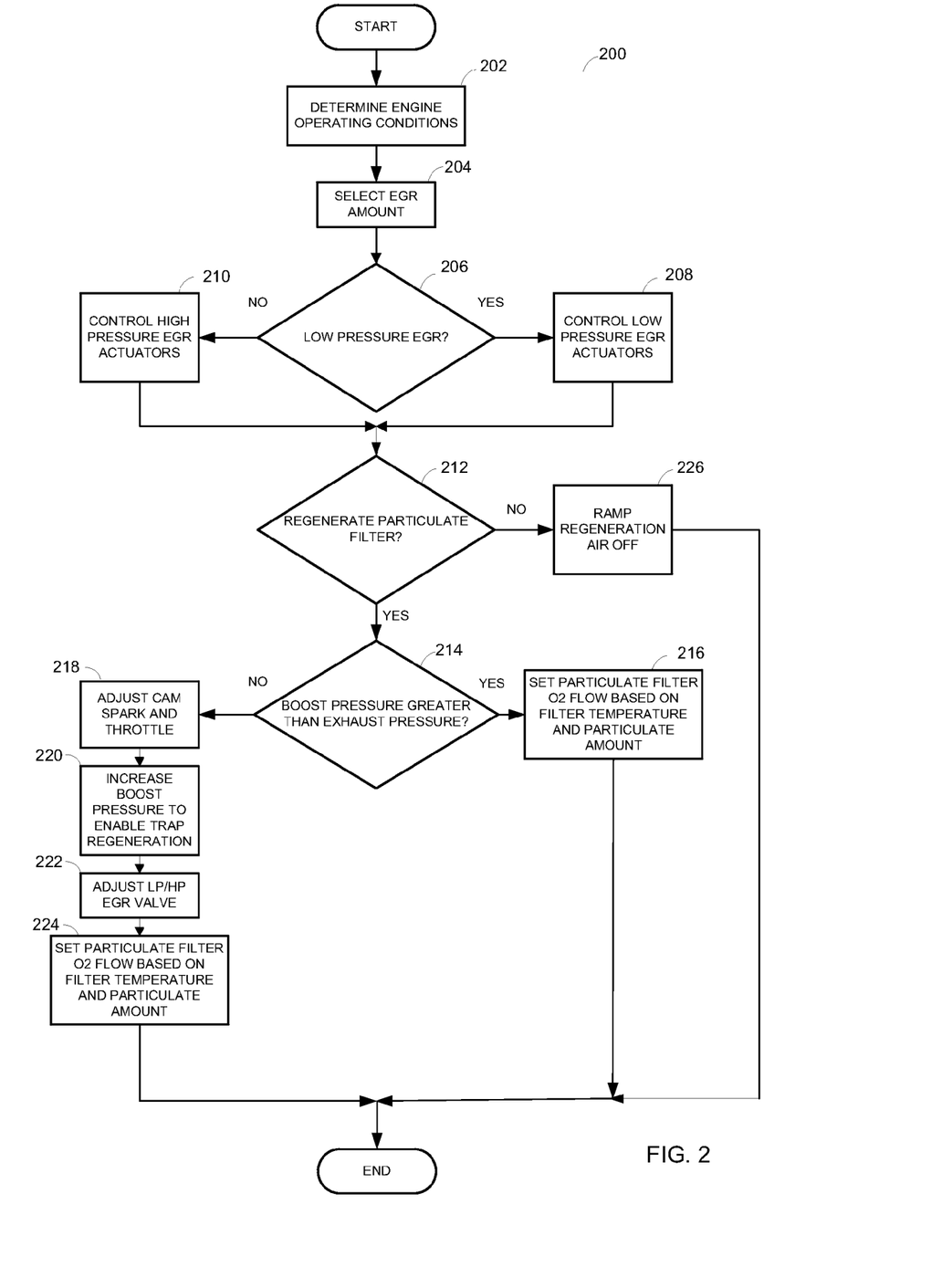
FIG. 2 shows a flow chart of a particulate filter regeneration routine.

Referring now to FIG. 2, a flow chart of particulate filter regeneration routine 200 is shown. At 202, engine operating conditions are determined from sensors and actuators. In one example, routine 200 determines engine temperature, ambient temperature, the pressure drop across a particulate filter, time since engine start, engine load, engine torque demand, engine speed, and amount of air inducted to the engine. In other example embodiments, additional or fewer operating conditions may be determined based on specific objectives.

At 204, the desired amount of EGR may be established in response to engine operating conditions. In particular, engine speed and requested torque are used to index a table or a function of empirically determined EGR amounts. The values contained in the table cells or in the function are interpolated, and a specific EGR amount corresponding to the present operating conditions is determined. It should be noted that in one embodiment, the output pressure of a supercharger or turbocharger is adjusted in response to a driver demand torque determined at 204, whether or not a particulate filter is regenerating. After determining the desired amount of EGR routine 200 proceeds to 206.

At 206, routine 200 judges which EGR loop from which to obtain EGR. In particular, routine 200 selects the EGR loop (high pressure loop or low pressure loop) in response to intake manifold pressure, engine speed, and driver demand torque. If EGR is desired by way of the low pressure loop, routine 200 proceeds to 208. Otherwise, routine 200 proceeds to 210. In an alternative embodiment, a combination of high pressure and low pressure EGR may be utilized in response to operating conditions.

At 210, controller 12 outputs commands to vacuum regulator valve 74 to adjust the position of an EGR valve in EGR valve assembly 72. In particular, controller 12 adjusts the EGR valve position in response to the pressure difference between the exhaust system pressure and the intake system pressure at a location downstream of compressor 90*b* to provide a desired amount of EGR that is empirically determined and stored in a table or function that may be indexed by engine speed and an operator desired torque request. In one embodiment, routine adjusts the EGR valve position in response to the pressure difference as observed across an orifice to achieve the desired EGR flow rate. The EGR valve position may be controlled in an open-loop or closed-loop manner. For example, the EGR valve position may be adjusted by a PID controller that resides in controller 12. Thus, the EGR valve position can be adjusted to provide exhaust gases from a location upstream of a particulate filter to the intake system. In this configuration, EGR may be drawn from a location in the exhaust system that is upstream of the particulate filter and directed to the intake system to a location downstream of a compressor. After adjusting the high pressure EGR, routine 200 proceeds to 212.

At 208, controller 12 outputs commands to vacuum regulator valve 172 to adjust the position of an EGR valve in EGR valve assembly 174. In particular, controller 12 adjusts the EGR valve position in response to the pressure difference between the exhaust system pressure and the intake system pressure at a location upstream of compressor 90*b* to provide a desired amount of EGR that is empirically determined and stored in a table or function that is indexed by engine speed and an operator desired torque request. In one embodiment, routine adjusts the EGR valve position in response to the pressure difference as observed across an orifice to achieve a desired EGR flow rate. The EGR valve position may be controlled in an open-loop or closed-loop manner. For example, the EGR valve position may be adjusted by a PID controller that resides in controller 12. Thus, in one configuration, EGR may be drawn from a location in the exhaust system that is downstream of the particulate filter and directed to the intake system to a location upstream of a compressor. After adjusting the low pressure EGR, routine 200 proceeds to 212.

At 212, routine judges whether or not to regenerate the particulate filter. In one embodiment, routine 200 makes a decision based on the pressure drop across a particulate filter. In another embodiment, routine 200 may decide to regenerate the particulate filter in response to a model. For example, a soot accumulation model that estimates the amount of soot produced by an engine may be the basis for regenerating a particulate filter. If the estimated amount of soot exceeds a threshold, particulate filter regeneration is initiated. On the other hand, if a pressure across the particulate filter is determined from a sensor or an estimating model, particulate filter regeneration may be initiated after the observed or estimated pressure exceeds a threshold.

In addition, other conditions may be included that determine when to regenerate the particulate filter. For example, filter regeneration may not proceed if engine temperature is above a threshold temperature or if engine temperature is below a threshold temperature. Further in one example, filter regeneration may not proceed if filter temperature is below a threshold. However, if soot is accumulated on the filter, controller 12 may elevate the filter temperature by retarding spark and increasing engine air flow until a threshold filter temperature is reached. In this example, particulate filter regeneration may proceed after the threshold temperature is reached. In still another example, particulate filter regeneration may not proceed for a period of time since engine start. For example, particulate filter regeneration may not be initiated until enough time for engine speed to stabilize after engine start has passed. In another embodiment, particulate filter regeneration may be initiated during deceleration fuel shut-off. In yet another embodiment, particulate filter regeneration may not be initiated unless engine load is greater than a threshold (for example, engine load may be the desired engine torque divided by total torque available from the engine; in other applications load may be the cylinder air charge divided by the total theoretical cylinder air charge), 0.3 load for example. If particulate filter regeneration is desired and conditions are met, routine 200 proceeds to 214. Otherwise, routine 200 proceeds to 226.

At 214, routine 200 judges if there may be sufficient pressure in the intake system to flow gases from the intake system to the exhaust system. In one example, a table or function that may be indexed by engine speed, turbocharger waste gate position or vane position, and desired torque may be used to determine if there is a pressure differential between the intake system and the exhaust system that is sufficient to drive gas flow from the intake system to the exhaust system. In another embodiment, pressure in the intake and exhaust systems may be determined by pressure sensors. Pressure in the intake system may be developed by a compressor of a turbocharger or by a supercharger. If the boost pressure in the intake system exceeds the exhaust pressure, routine 200 proceeds to 216. Otherwise, routine 200 proceeds to step 218.

At 218, adjustments are made to engine actuators so that boost pressure can be adjusted while maintaining the desired engine torque or following the driver demand torque. In one embodiment, when boost pressure (e.g., pressure in the intake system downstream of a compressor) is less than exhaust system pressure at a location upstream of the particulate filter, cam timing is adjusted to produce a desired engine torque while boost pressure is increased. This method allows gases to flow from the intake system to the exhaust system while engine torque follows driver demand torque. Depending on the engine configuration, cam timing with respect to valve opening events may be advanced or retarded relative to crankshaft position as boost pressure is increased. The cam timing adjustments can be determined from tables or functions that hold empirically determined cam timing adjustments to provide an engine air amount that is equivalent to the engine air amount before particulate filter regeneration was initiated. However, note that engine air amount is equivalent before boost is increased and after boost is increased when driver demand torque remains constant; but, if driver demand torque increases during filter regeneration, cam timing and throttle position may be adjusted to provide the desired air amount that corresponds to the increased driver demand torque.

In another embodiment, when the driver demand torque is substantially zero (e.g., less than 2% of full load engine torque) the compressor boost pressure can be adjusted so that the boost pressure is below a threshold value when a driver demand torque is substantially zero and when the particulate filter is not being regenerated. Thus, boost pressure can be reduced below a threshold when the particulate filter is not being regenerated so that the engine performs less work and conserves fuel.

In another embodiment, spark timing may be retarded so that the desired engine torque is provided when boost pressure is increased. The spark may be retarded as a function of boost pressure increase. For example, if boost pressure is increased by 40 mm-$H_2O$ then spark may be retarded by 5 crankshaft angle degrees.

In another embodiment when a throttle may be located downstream of a compression device, throttle position can be moved toward a closed position as boost pressure is increased. In particular, if a throttle is located downstream of a compressor, the throttle opening amount may be reduced so that gases upstream of the throttle body may be directed to a location in the exhaust system upstream of the particulate filter.

In another embodiment, spark timing, throttle position, and cam timing may be adjusted when boost pressure is adjusted to compensate for the increased boost pressure that enables gas flow from the intake system to the exhaust system. In still other embodiments, combinations and sub-combinations of spark, throttle, and cam adjustments may be made to account for adjusting boost pressure. After adjusting actuators routine 200 proceeds to 220.

At 220, boost pressure is increased so that gases can flow from the intake system to the exhaust system. In one example, turbocharger variable geometry vanes may be adjusted to increase boost pressure. In another example, turbocharger waste gate position may be adjusted to increase boost pressure. Boost pressure can be increased subject to surge and compressor limitations. For example, if increasing boost pressure would result in a surge condition, boost pressure may be increased up to a pressure that is less than the surge threshold pressure. In one example, boost pressure is increased a constant amount over the boost pressure that will induce flow from the intake system to the exhaust system. For example, boost pressure can be increased by 60 mm-$H_2O$ over a level that produces flow from the intake system to the exhaust system. The actuator adjustments that increase boost may be based on empirical data stored in memory of a controller. After adjusting boost pressure routine 200 proceeds to 222.

At 222, routine 200 adjusts a position of the low pressure and/or high pressure EGR valve depending on which pressure loop is activated. Since EGR may be flowing into the intake system at the same time intake system gases are flowing to the exhaust system the position of the EGR valve may be changed as boost pressure is increased. In one example, the opening amount of the low pressure EGR valve may be reduced when boost pressure is increased. In addition, increasing flow into the intake system can tend to increase EGR flow into the compressor if the EGR valve position remains constant because the pressure at the inlet of the compressor may be reduced, thereby increasing the pressure difference between the intake system and the exhaust system. Therefore, the low pressure EGR valve is moved toward a closed position. In another example, the flow in the high pressure EGR loop may decrease if the high pressure EGR valve position remains constant because the pressure increase in the intake system can reduce flow from the exhaust system to the intake system. Therefore, the high pressure EGR control valve may be moved to a more open position so that the desired EGR flow rate may be achieved as boost pressure increases. After adjusting one or more EGR valves, routine 200 proceeds to 224.

At 224, routine 200 enables particulate filter regeneration and sets the flow rate between the intake system and the exhaust system. The flow rate from the intake system to the exhaust system may be determined in response to the driver demand torque, amount of EGR, amount of stored particulates, and particulate filter temperature.

In one embodiment, flow from the intake system to the exhaust system may be established based on a mass flow rate of oxygen. The amount of oxygen entering the engine can be determined from a mass air flow rate sensor. But since EGR may also be flowing into the intake system, the gases flowing from the intake system to the exhaust system may include oxygen and EGR. Therefore, the total mass of gases flowing from the intake system to the exhaust system by way of the particulate filter regeneration loop may be increased to compensate for the fraction of EGR in the intake system as compared to a situation where no EGR is present in the intake system. The position of the EGR valve can be determined from the pressure drop that occurs across an orifice that is placed in the particulate filter regeneration loop and the desired flow rate. By knowing the EGR mass entering the intake system, and by knowing the oxygen mass entering the intake system, oxygen concentration in the intake system can be determined. The oxygen concentration multiplied by the flow rate from the intake system to the exhaust system determines the amount of oxygen delivered to the particulate filter. The particulate filter air supply valve assembly opening can be opened further to increase the amount of oxygen flowing to the particulate filter when EGR is flowing to the intake system from the exhaust system.

In another example, the flow rate between the intake system and the exhaust system can be based on empirically determined flow rates which can be adjusted in response to temperature sensor located downstream from the particulate filter. For example, the position of particulate filter air supply valve assembly may be commanded to a predetermined position as particulate filter regeneration is initiated. As the temperature in the exhaust system increases due to oxidation of particulates, the valve position may be opened further to provide additional oxygen to the oxidation process after oxidation has started. However, if the temperature of the particulate filter or downstream from the particulate filter increases beyond a threshold, the flow of oxygen from the intake system to the exhaust system may be reduced to control the particulate filter temperature.

In another example, the flow rate between the intake system and the exhaust system can be based on empirically determined flow rates and that can be adjusted in response to an oxygen sensor located upstream or downstream from the particulate filter. For example, when a particulate filter is at a temperature where regeneration can occur, oxygen may be introduced upstream of the particulate filter. If the amount of oxygen sensed downstream of the filter increases above a threshold, the particulate filter air supply valve may be moved toward a closed position (valve opening amount may be decreased). On the other hand, if a downstream oxygen sensor indicates a reduction of oxygen as compared to the amount of oxygen present upstream from the particulate filter, flow from the intake system to the exhaust system may be increased. However, it should be noted that an increase in flow from the intake system to the exhaust system may be limited in response to the time since regeneration was initiated and in response to particulate filter temperature. For example, if the particulate filter temperature increases above a threshold temperature or decreases below a threshold temperature, the amount of flow from the intake system to the exhaust system may be reduced. On the other hand, the particulate filter air supply valve may be moved from a first open position to a second open position that is more closed than the first open position when the concentration of oxygen in the exhaust system between the catalyst and the particulate filter exceeds a threshold. Likewise, the particulate filter air supply valve may be moved from a first open position to a second open position that is more open than the first open position when the concentration of oxygen in the exhaust system between the catalyst and the particulate filter is below a threshold. Further, if the amount of oxygen in the exhaust system at a location downstream of a particulate filter exceeds a threshold value, the flow of gases from the intake system to the exhaust system can be inhibited.

In yet another example, the position of particulate filter air supply valve assembly may follow a predetermined trajectory stored in a controller. Different particulate filter air supply valve trajectories may be provided for different operating conditions. For example, the particulate filter air supply valve position may be adjusted to follow a first trajectory in response to an amount of soot held in the particulate filter. In another example, the particulate filter air supply position may be adjusted to follow a second trajectory in response to inferred or observed particulate filter temperature. Thus, the amount of oxygen supplied to the particulate filter may vary depending on operating conditions.

In addition, as intake gases begin to flow from the intake system to the exhaust system, the turbocharger waste gate position or variable geometry vanes may be adjusted to maintain a desired boost pressure. For example, a waste gate control valve may be moved to a more closed condition so that a greater amount of exhaust gases impinge on the turbocharger turbine. For turbochargers having variable geometry vane control, the vanes may be moved such that the exhaust gases perform more work on the turbocharger turbine. Thus, the turbine efficiency can be increased so that the turbocharger compressor pumps additional air to the intake system when gases flow from the intake system to the exhaust system. In addition, an amount of air delivered from the intake system to the exhaust system can be subtracted from an amount of air entering the engine air intake system. By subtracting off the portion of air that goes to the exhaust system, the engine may be operated at a substantially stoichiometric air-fuel mixture when the particulate filter is being regenerated.

At 216, the amount of oxygen supplied to a particulate filter may be determined similarly.

At 226, particulate filter regeneration air may be ramped off. If particulate filter regeneration is complete, or if operating conditions make particulate filter regeneration difficult or impracticable, the particulate filter air supply valve can be ramped closed. The particulate filter air supply valve can be ramped closed according to a predetermined trajectory residing in a controller.

In another example, the particulate filter air supply valve may be controlled in response to an oxygen sensor located in the exhaust system downstream of the particulate filter. In some embodiments it may be advantageous to have a catalyst positioned behind the particulate filter. For such configurations, the state of the downstream catalyst can be regulated in response to an oxygen sensor positioned between a particulate filter and the catalyst. For example, fuel can be enriched while the particulate filter air supply valve is being moved to a closed position so that excess oxygen is removed from the downstream catalyst. If the oxygen sensor determines that the post particulate mixture is leaner than desired, the particulate filter air supply valve can be closed at an increased rate. On the other hand, if the oxygen sensor determines that the post particulate mixture is richer than desired, the particulate filter air supply valve can be closed at a decreased rate.

Figure 3:
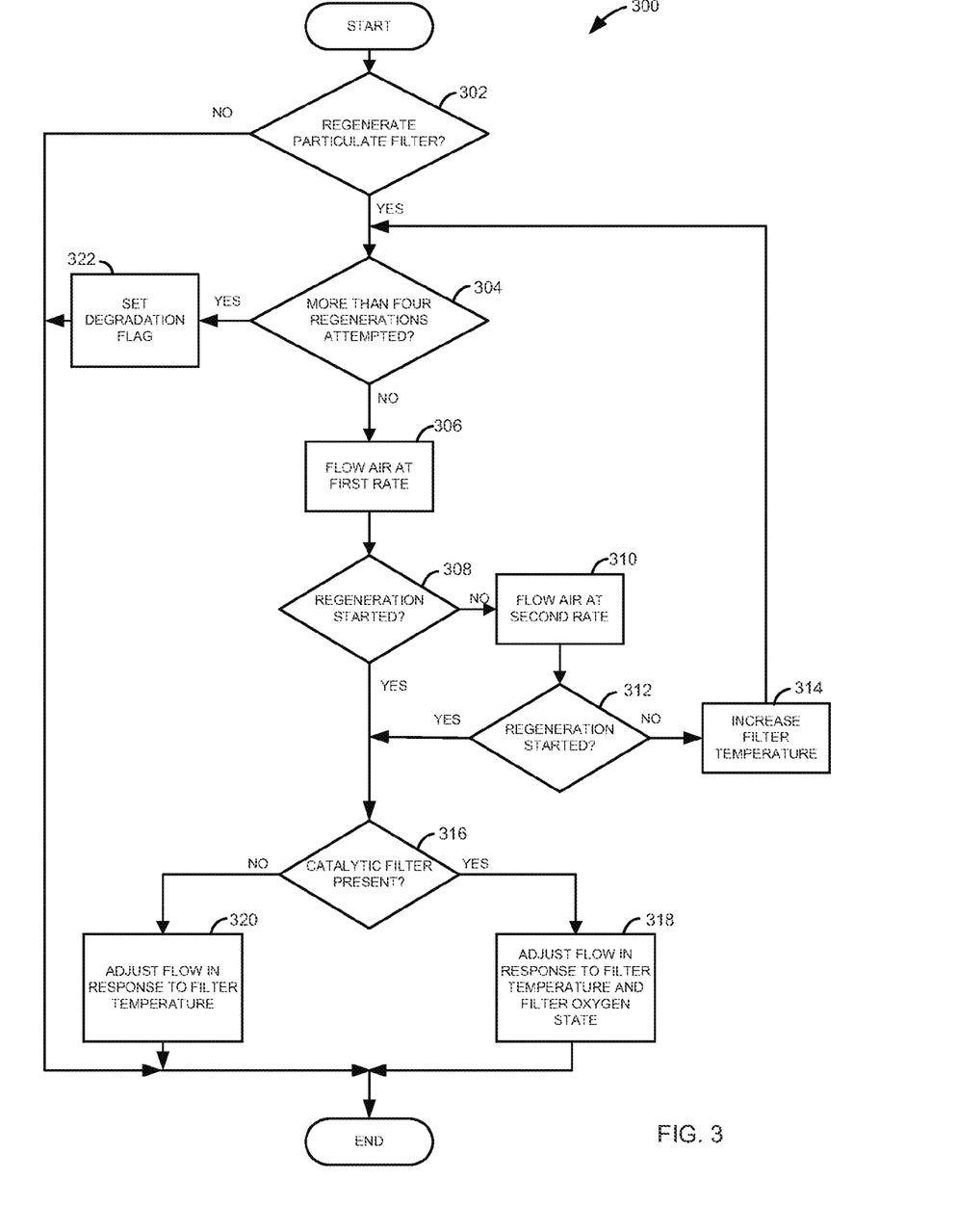
FIG. 3 shows a flow chart of a flow control routine for adjusting flow from the intake system to the inlet of a particulate filter.

Referring now to FIG. 3 a flow chart of a flow control routine for adjusting flow from the intake system to the inlet of a particulate filter is shown. At 302, routine 300 determines if conditions are met to regenerate a particulate filter. Conditions may include but are not limited to the pressure drop across the particulate filter, engine temperature, the amount of time since engine start, and particulate filter temperature. In one example, regeneration is commenced when particulate filter temperature exceeds a threshold and when the pressure drop across the particulate filter exceeds a threshold. If particulate filter regeneration is desired routine 300 proceeds to 304, otherwise routine 300 exits.

At 304, routine 300 determines whether or not more than four attempts have been made to regenerate a particulate filter without regeneration occurring. Alternatively, the number of regeneration attempts can be increased or decreased, if desired. For example, if air has been introduced to a particulate filter that is at a threshold temperature and there is no increase in particulate filter temperature, or no reduction in oxygen concentration of gases passing through the particulate filter, or no decrease in pressure drop across the particulate filter, then the filter may be judged as not regenerated. If routine 300 judges that more than four particulate filter regeneration attempts have been made, routine 300 proceeds to 322 where a degradation flag is set so that an additional attempt at particulate filter regeneration will not be made until the system has been checked or a parameter changes that allows additional regeneration attempts. Of course, a fewer or greater number or regeneration attempts may be made.

At 306, a mass air flow rate from the intake system to the exhaust system may be commanded. In one example, the mass air flow rate may be established by setting a position of the particulate filter air supply valve in response to a table or function that is indexed by engine speed, amount of EGR, and intake system pressure. The particulate filter air supply valve position can vary with operating conditions such that a desired flow rate between the intake system and the exhaust system is established. Routine 300 then proceeds to 308.

At 308, routine 300 judges whether particulate filter regeneration has started. As stated above, particulate filter regeneration may be determined from particulate filter temperature or from a change of oxygen in engine exhaust gases, or from a change in pressure drop across the particulate filter. For example, particulate filter regeneration may be judged as started if a temperature of a particulate filter increases by more than 10° C. without a change in engine operating conditions. In another example, particulate filter regeneration may be judged as started if a concentration of oxygen in a gas passing through a particulate filter decreases by more than 5%, or a decrease in pressure drop of 2kPA for example. If routine 300 judges particulate filter regeneration has commenced, routine 300 proceeds to 316. Otherwise, routine 300 proceeds to 310.

At 310, a second particulate filter regeneration may be attempted by increasing the flow rate between the intake system and the exhaust system. In one example, the flow rate between the intake system and the exhaust system is increased by 10%. After increasing the flow from the intake system to the exhaust system, routine 300 proceeds to 312.

At 312, it is judged whether or not particulate filter regeneration has commenced as is described at 308. If regeneration has not started, routine 300 proceeds to 314. Otherwise, routine 300 proceeds to 316.

At 314, filter temperature is increased. In one embodiment, filter temperature may be increased by retarding spark timing and increasing mass air flow through the engine. By retarding spark, driver torque demand is maintained while air flow through the engine increases. Therefore, the engine controller can meet driver demand while increasing the amount of heat delivered to the particulate trap. Routine 300 then proceeds to 304 and attempts to regenerate the particulate filter another time. In one example, the particulate filter temperature is increased by a predetermined amount, 20° C. for example.

At 316, routine 300 judges whether or not the particulate filter has a catalytic coating. If not, routine 300 proceeds to 320. If so, routine 300 proceeds to 318. In some engine configurations it may be beneficial for a particulate filter to have a catalytic coating. The coating may improve oxidation of particulates and may help to reduce the amount of hydrocarbons emitted from the vehicle tailpipe. However, in other applications a catalytic coating may be less desirable because it may make air-fuel control more difficult because the coating may change the exhaust constituents in an undesirable way. Therefore, the engine controller can be programmed to store information as to whether or not the particular particulate filter has a wash coat for processing exhaust gases.

At 320, routine adjusts flow from the intake system to the exhaust system by the same method describe at 226 of FIG. 2. After adjusting the flow rate routine 320 exits.

At 318, the routine adjusts flow from the intake system to the exhaust system by the method described at 216 of FIG. 2, but routine 300 also adjusts the flow in response to the oxygen state of the particulate filter. For example, the particulate filter air supply valve position can be varied according to a predefined trajectory or function that is related to the level of oxygen storage available in the particulate filter wash coating. In particular, the particulate filter air supply valve position may be modulated at a frequency, 1 Hz for example. In another example, the particulate filter air supply valve position and engine fuel amount may be modulated in response to the output of an oxygen sensor positioned downstream of the particulate filter. And in yet another example, the particulate filter supply valve position may be varied in response to an oxygen sensor positioned upstream of the particulate filter and an oxygen sensor positioned downstream of the particulate filter. In particular, the particulate filter supply valve position can be adjusted in response to the oxygen concentration and flow rate of exhaust gases entering the particulate filter as well as the oxygen concentration of gases exiting the particulate filter. In one embodiment, the particulate filter air supply valve position may be adjusted in response to an amount of oxygen stored in the particulate filter along with the amount of soot held by the filter and the rate of soot oxidation. For example, the flow rate of intake gases from the intake system to the exhaust system can be increased as the amount of oxygen utilized or stored in the particulate filter increases. Likewise, the amount of flow from the intake system to the exhaust system can be decreased as the amount of oxygen utilized or stored in the particulate filter decreases.

Figure 4:
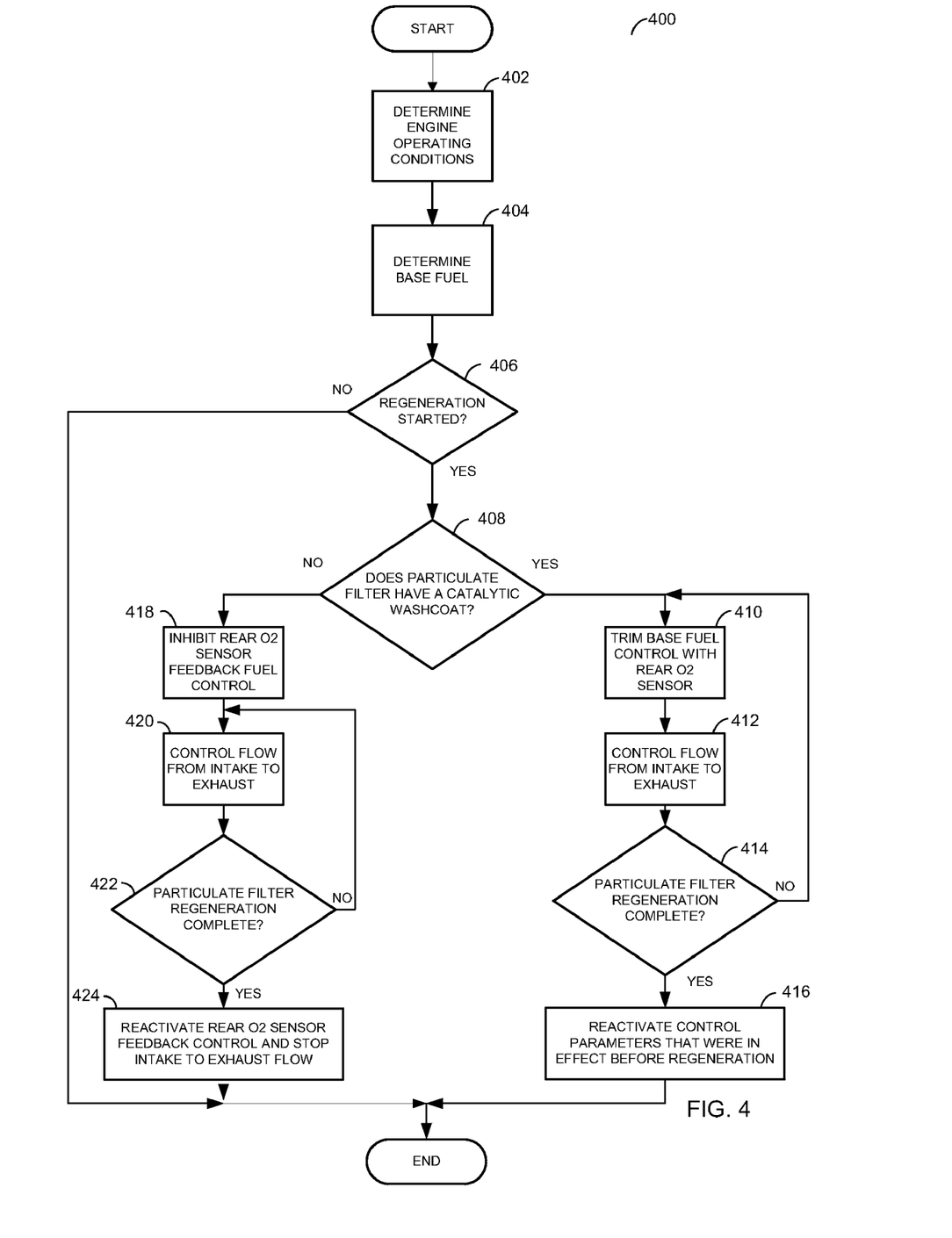
FIG. 4 shows a fuel control routine for controlling engine fuel during regeneration of a particulate filter.

Referring now to FIG. 4, a flow chart of a fuel control routine for controlling engine fuel during regeneration of a particulate filter is shown. At 402, engine operating conditions are determined from sensors and actuators. In one example, routine 400 determines engine temperature, ambient temperature, the time since engine start, engine load, engine torque demand, engine speed. In other example embodiments, additional or fewer operating conditions may be determined based on specific objectives. After determining operating conditions, routine 402 proceeds to 404.

At 404, routine 400 determines the base engine fuel amount. In one example, the base fuel amount may be determined in response to the desired driver demand torque and engine speed. In particular, the desired demand torque requested by a driver is translated into an amount of fuel and air that may be required at the present engine speed to output the desired engine torque. Desired engine torque and engine speed can be used to index a table that holds an empirically determined fuel amount that corresponds to an amount of fuel in a substantially stoichiometric air-fuel mixture (e.g., ±0.06 lambda, where lambda is air-fuel ratio divided by the stoichiometric air-fuel ratio) that provides the desired engine torque. After determining the base engine fuel, routine 400 proceeds to 406.

At 406, routine 400 judges whether or not regeneration of a particulate filter has commenced. If so, routine 400 proceeds to 408. If not, routine 400 proceeds to exit. As described at 308 of FIG. 3, particulate filter regeneration may be established when a temperature of a particulate filter increases by more than a threshold amount, 10° C. for example, without a change in engine operating conditions. Further, particulate filter regeneration may be judged as started if a concentration of oxygen in a gas passing through a particulate filter decreases by more than a threshold amount, 5% for example. If particulate regeneration is judged to have started routine 400 proceeds to 408. Otherwise, routine 400 proceeds to exit.

At 408, routine 400 judges whether or not a particulate filter has a catalytic wash coat. In one embodiment, the engine controller can be programmed to store information as to whether or not the particular particulate filter has a wash coat for processing exhaust gases. If so, routine 400 proceeds to 410. If not, routine 400 proceeds to 418.

At 418, routine 400 inhibits adjustments to the base engine fuel amount established at 404. Since oxygen is introduced from the intake system to the exhaust system upstream from the particulate filter and downstream from the catalyst, an oxygen sensor located downstream of the particulate filter may have an output that is affected by the introduced oxygen. Consequently, if the base fuel is adjusted in response to oxygen that is introduced from the intake system, engine fueling may deviate from a desired fuel amount. For example, if an oxygen sensor located downstream of a particulate filter detects excess oxygen, fuel to the engine may be increased so that the gases entering an upstream three-way catalyst are rich rather than a desired stoichiometric mixture. Consequently, the conversion efficiency of the three-way catalyst may degrade, at least for some exhaust gas constituents. In particular, additional hydrocarbons and CO may be present in the tailpipe exhaust gases. Therefore, output from an oxygen sensor located downstream of the location where intake gases are introduced to the exhaust system can be disregarded by the fuel control routine so that the base fuel amount is not affected by the downstream oxygen sensor. After inhibiting adjustments to the base fuel in response to the downstream oxygen sensor, routine 400 proceeds to 420.

In an alternative embodiment, routine 400 may adjust a fuel amount delivered to a cylinder in response to an oxygen sensor located downstream of a particulate filter and upstream of a second three-way catalyst. In one example, an amount of fuel delivered to a cylinder may be enriched if exhaust gas oxygen concentration downstream of a particulate filter is leaner than stoichiometric exhaust gas. In another example, an amount of fuel delivered to a cylinder may be leaned if exhaust gas oxygen concentration downstream of a particulate filter is richer than stoichiometric exhaust gas. Alternatively, the amount of intake gases flowing to the exhaust system may be decreased when an oxygen concentration in the exhaust system at a location downstream of a particulate filter is leaner (e.g., a higher concentration of oxygen in the exhaust gases) than that of stoichiometric exhaust gases. The amount of intake gases flowing to the exhaust system may be increased when an oxygen concentration in the exhaust system at a location downstream of the particulate filter is richer (e.g., a lower concentration of oxygen in the exhaust gas) than that of stoichiometric exhaust gases.

In yet a further embodiment, routine 400 may adjust fuel amount delivered in response to an oxygen sensor located downstream of a particulate filter and in response to a flow rate of gases from the intake system to the exhaust system. For example, if the concentration of oxygen in the exhaust system minus the oxygen concentration supplied to the exhaust system by way of the intake system is higher than desired, engine fuel can be increased to compensate for the additional oxygen in the exhaust gases. On the other hand, if the concentration of oxygen in the exhaust system minus the oxygen concentration supplied to the exhaust system by way of the intake system is lower than desired, engine fuel amount can be decreased to compensate for less oxygen in the exhaust gases.

At 420, flow from the intake system to the exhaust system may be controlled. In particular, flow from the intake system to the exhaust system is controlled as described at 216 of FIG. 2. A reiteration of the method is omitted here for conciseness.

At 422, routine 400 judges whether or not filter regeneration may be complete or if conditions for regeneration are no longer present. In one embodiment, regeneration may be determined complete when the pressure difference across the particulate filter is less than a predetermined amount. In another example, regeneration may be determined as complete when the exhaust gas downstream of the particulate filter indicates an increase in oxygen concentration in exhaust gases that pass through the particulate filter. The increased oxygen concentration may be an indicator that soot in the filter has been oxidized and that the amount of soot is reduced such that less oxygen is consumed to oxidize soot remaining in the filter. If routine 400 judges that regeneration is complete, routine 400 proceeds to 424. Otherwise, routine 400 proceeds to 420.

At 424, feedback control of the base engine fuel determined at 404 is reactivated. Further, gas flow from the intake system to the exhaust system may be stopped. In one embodiment, flow from the intake system to the exhaust system may be stopped as described at 226 of FIG. 2.

At 410, routine 400 adjusts the base fuel amount determined at 404. In one embodiment, the frequency, bias, or extent of leanness or richness of a modulated fuel amount delivered to cylinders of the engine can be adjusted in response to an oxygen sensor located downstream of a particulate filter that has a catalytic coating. Note that fuel control terms such as bias, extent of leanness or richness, and frequency can also be adjusted in response to an oxygen sensor located upstream of a catalyst. Further, fuel control terms bias, extent of leanness or richness, and frequency may be adjusted by an oxygen sensor or by more than two oxygen sensors (e.g., a sensor located upstream of a first catalyst, a sensor located upstream of a particulate filter, and a third sensor located downstream of the particulate filter; a sensor located upstream of a first catalyst, a sensor located downstream of a particulate filter, and a third sensor located downstream of a second catalyst). When the engine is operating and the particulate filter is not being regenerated, engine base fuel may be adjusted in response to the downstream oxygen sensor by a first group of control parameters or variables, the first group of control parameters may include but is not limited to a bias term (for example, a rich or lean shift in the average cylinder air-fuel mixture), extent of leanness or richness term, and a first modulation frequency term that are related to the engine air-fuel mixture ratio. In addition, the first group of control parameters may include cam angle or timing as well as spark timing and throttle position. The base fuel determined at 404 along with the first bias, the first extent of leanness or richness, and the first modulation frequency act to operate the engine at a substantially stoichiometric air-fuel mixture. After particulate regeneration has started (e.g., after flow is established from the intake system to the exhaust system), the base fuel may be adjusted in response to the oxygen sensor located downstream of the particulate filter by operating the engine with a second set of control parameters or variables that are different from the first group of control parameters or variables, the second group of control parameters may include but are not limited to a bias term, a second extent of leanness or richness term, and a second modulation frequency term that are related to the engine air-fuel mixture ratio. In addition, the second group of control parameters may include cam angle or timing as well as spark timing and throttle position. The base fuel determined at 404 along with the second bias, the second extent of leanness or richness, and the second modulation frequency act to operate the engine at a substantially stoichiometric air-fuel mixture; however, the mixture may be biased slightly rich to compensate for the introduction of air into the exhaust system. By operating the engine a substantially stoichiometric conditions, a three-way catalyst positioned upstream of the particulate filter operates at a high efficiency whether or not the particulate filter is being regenerated. Further, the bias, extent of leanness or richness, and modulation frequency may be adjusted in response to an amount of soot stored or being oxidized in the regeneration process. For example, a rich bias may enrich the engine air-fuel ratio so that less NOx is produced by the engine when the particulate filter is regenerated and so that the conversion efficiency of NOx by the catalyst increases during particulate filter regeneration. And, the intake gases introduced into the exhaust system help to lower HC emissions by increased oxidation that is made available by the excess oxygen downstream of the catalyst.

At 412, routine 400 controls the flow from the intake system to the exhaust system. In particular the method described at 318 of FIG. 3 controls flow between the intake system and the exhaust system. A reiteration of the method described at 318 is omitted here for conciseness. At 414, routine judges if regeneration of the particulate filter may be complete. The same method for determining that regeneration may be complete used at 422 is used at 414. If particulate filter regeneration is not complete, routine 400 proceeds to 410. Otherwise, routine 400 proceeds to 416. At 416, the first bias, the first extent of leanness or richness, first modulation frequency of the engine air-fuel mixture ratio are reactivated so that the oxygen storage capacity of the upstream catalyst as well as the oxygen storage capacity of the particulate filter and any catalyst positioned downstream of the particulate filter can be controlled. In one embodiment, the first bias, first extent of leanness or richness, and first frequency are adjusted so that between 20%-80%, and preferably between 40%-60% percent of the available oxygen storage available in the aftertreatment system is being utilized to store oxygen when the engine is operating. After reactivating the first group of fuel control parameters, routine 400 exits.

Thus, the routine of FIG. 4 provides for a method where a controller supplies fuel to a direct injection gasoline engine in response to a first group of conditions. Further, the controller supplies fuel to the direct injection engine in response to a second group of conditions, the second group of conditions different from the first group of conditions. As such, the controller can operate the direct injection gasoline engine so that engine fuel is adjusted to accommodate regeneration of a particulate filter with gases supplied from the intake system.

Particulate filter regeneration may be assisted by a turbocharger or supercharger in an additional way. In particular, intake manifold gases may be pushed through an engine cylinder during intake and exhaust valve overlap periods to supply oxygen to the particulate filter without having to produce a lean air-fuel mixture. U.S. Pat. No. 7,275,516 describes a method for flowing gases from an intake manifold to an exhaust manifold and is hereby fully incorporated by reference for all intents and purposes. When regeneration of a particulate filter is desired, gases from the intake system can be directed to the exhaust system through engine cylinders by adjusting boost pressure and valve timing. And, the formation of NOx may be reduced by enriching the cylinder air-fuel mixture by injecting fuel into the cylinder after the exhaust valve has closed. In this way, lean gases from the intake system can be directed to the exhaust system without leaning the cylinder air-fuel mixture.

Figure 5:
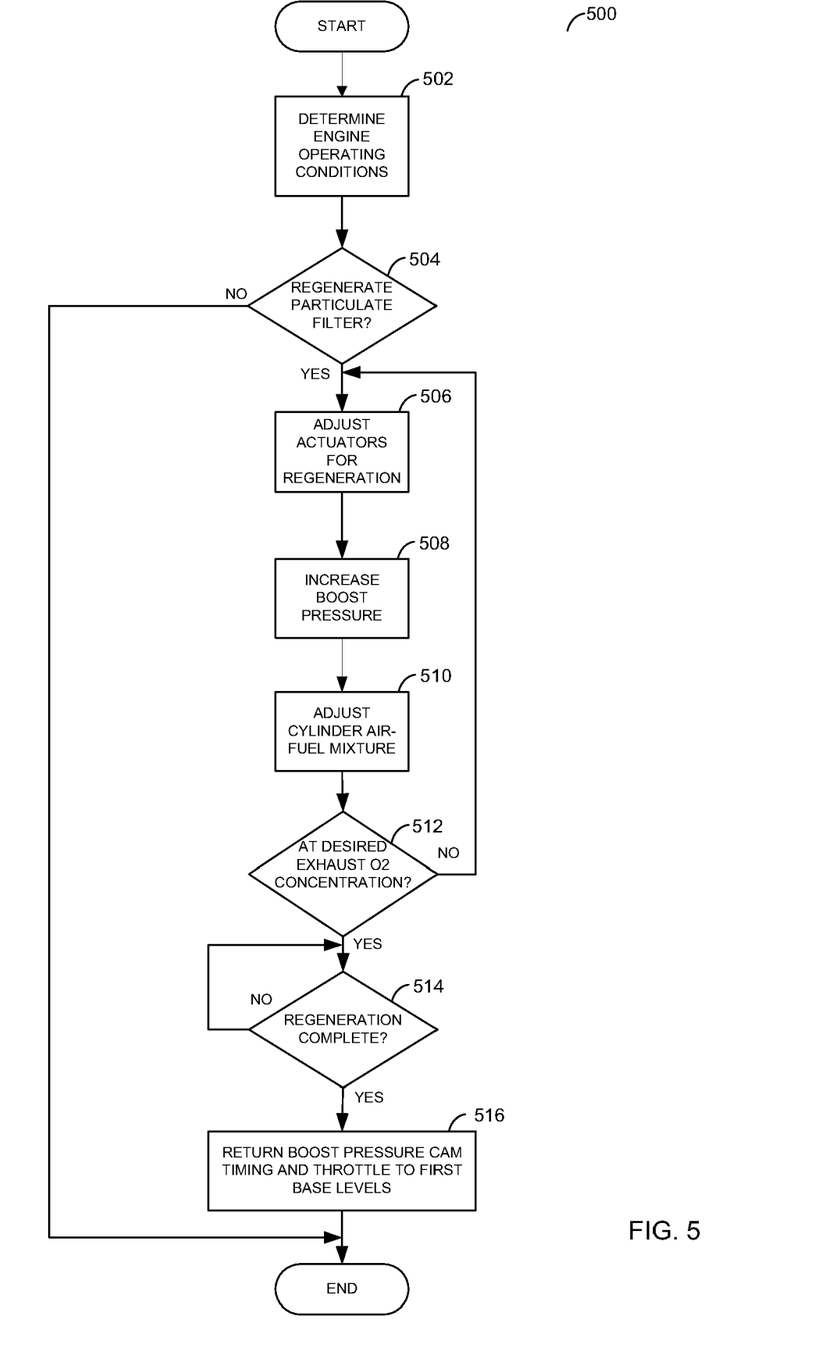
FIG. 5 shows a flow chart for an alternative method for regenerating a particulate filter.

Referring now to FIG. 5, a flow chart for an alternative method for regenerating a particulate filter is shown. At 502, engine operating conditions are determined from sensors and actuators. In one example, routine 500 determines engine temperature, ambient temperature, the pressure drop across a particulate filter, time since engine start, engine load, engine torque demand, engine speed, and amount of air inducted to the engine. In other example embodiments, additional or fewer operating conditions may be determined based on specific objectives.

At 504, routine judges whether or not to regenerate the particulate filter. In one embodiment, routine 500 makes a decision based on the pressure drop across a particulate filter. In another embodiment, routine 500 may decide to regenerate the particulate filter in response to a model as described at 212 of FIG. 2.

In addition, other conditions may be included that determine when to regenerate the particulate filter. For example, filter regeneration may not proceed if engine temperature is above a threshold temperature or if engine temperature is below a threshold temperature. Further in one example, filter regeneration may not proceed if filter temperature is below a threshold. However, if soot is accumulated on the filter, controller 12 may elevate the filter temperature by retarding spark and increasing engine air flow until a threshold filter temperature is reached. In this example, particulate filter regeneration may proceed after the threshold temperature is reached. In still another example, particulate filter regeneration may not proceed for a period of time since engine start. For example, particulate filter regeneration may not be initiated until enough time for engine speed to stabilize after engine start has passed. In yet another embodiment, particulate filter regeneration may not be initiated unless engine load is greater than a threshold. If particulate filter regeneration is desired and conditions are met, routine 500 proceeds to 506. Otherwise, routine 500 proceeds to exit.

At 506, adjustments are made to engine actuators so that boost pressure can be increased while intake gases flow to the exhaust system and maintaining the desired engine torque or following the driver demand torque. Depending on the engine configuration, cam timing with respect to valve opening events may be advanced or retarded relative to crankshaft position as boost pressure is increased. The cam timing adjustments can be determined from tables or functions that hold empirically determined cam timing adjustments to provide an engine air amount that is equivalent to the engine air amount before particulate filter regeneration was initiated. However, note that engine air amount may be equivalent before boost is increased and after boost is increased when driver demand torque remains constant; but, if driver demand torque increases during filter regeneration, cam timing may be adjusted to provide the desired air amount that corresponds to the increased driver demand torque. Further, the exhaust valve opening time and the intake valve closing time are adjusted such that intake gases can flow from the intake system to the exhaust system. In one example, the valve overlap is described in a table or function that is indexed by a desired flow rate from the intake system to the exhaust system, the desired boost pressure, and engine speed.

When particulate filter regeneration is requested, the time that the intake valve and exhaust valve are simultaneously open is increased by advancing or retarding the intake camshaft or the exhaust camshaft, thereby allowing additional intake gases to flow to the exhaust system. In some applications the throttle position may also be adjusted. Thus, camshaft timing can be adjusted in response to an operating condition of a particulate filter, a pressure drop across the particulate filter of a temperature of the particulate filter for example. Further, the boost pressure may be adjusted in response to an oxygen concentration determined by a sensor located upstream or downstream of a particulate filter. In one embodiment, compressor boost pressure can be decreased if an oxygen concentration sensed in the exhaust system is more than a threshold amount. Conversely, if an oxygen concentration sensed in the exhaust system is less than a threshold amount, compressor boost pressure can be increased.

Spark advance may also be adjusted during particulate filter regeneration. In one example, spark may be retarded to increase the particulate filter temperature. In another example, spark timing can be adjusted in response to an operating condition of a particulate filter. For example, if more than a threshold amount of soot is held by the particulate filter the spark may be retarded to a first value. As the particulate filter regenerates, the spark may be retarded to a second value, the second value less than the first value. After adjusting actuators routine 500 proceeds to 508.

At 508, boost pressure may be increased so that gases can flow from the intake system to the exhaust system. In one example, turbocharger variable geometry vanes may be adjusted to increase boost pressure. In another example, turbocharger waste gate position may be adjusted to increase boost pressure. Boost pressure can be increased subject to surge and compressor limitations. For example, if increasing boost pressure would result in a surge condition, boost pressure may be increased up to a pressure that is less than the surge threshold pressure. In one example, boost pressure is increased a constant amount over the boost pressure that will induce flow from the intake system to the exhaust system. For example, boost pressure can be increased by 60 mm-$H_2O$ over a level that produces flow from the intake system to the exhaust system. The actuator adjustments that increase boost may be based on empirical data stored in memory of a controller. Thus, compressor boost pressure may be adjusted in response to a condition of a particulate filter, a pressure drop across the particulate filter, a rate of soot oxidation, or a temperature of the particulate filter for example. In one example, boost can be increased as the rate of soot oxidation increases. After adjusting boost pressure routine 500 proceeds to 510.

At 510, fuel injected into the cylinder may be enriched during particulate filter regeneration. In one example, fuel may be injected into the cylinder after the exhaust valve closes so that fuel is not transported to the exhaust system. Enriching the cylinder mixture may lower NOx produced in the engine cylinder while intake system gases that pass through the cylinder to the exhaust system can be used to oxidize soot on the particulate filter. In one example, the additional fuel injected to enrich the cylinder mixture may be based on the amount of intake gases flowing through to the exhaust system that have not participated in a combustion event in the cylinder. When the cylinder mixture is enriched it is subsequently combusted and then mixed with the exhaust gases that passed from the intake system to the exhaust system. As a result, the gas mixture in the exhaust system can be brought closer to a desired oxygen concentration. Thus, performance of a three-way catalyst located upstream or downstream of the particulate filter can be improved as compared to when a lean exhaust mixture is delivered to the catalyst. In another embodiment, the amount of fuel supplied to a cylinder of the engine may be adjusted in response to a rate of soot oxidation. For example, if a temperature of a particulate filter increases or if the pressure drop across a particulate filter decreases, it may be determined that the rate of soot oxidation is increasing. Conversely, if a temperature of a particulate filter decreases or if the pressure drop across a particulate filter is substantially constant for a given exhaust flow rate, it may be determined that the rate of soot oxidation is decreasing. If the soot oxidation rate is increasing the amount of fuel delivered to a cylinder may be increased. If the soot oxidation rate is decreasing the amount of fuel delivered to the cylinder may be decreased.

In addition, the amount of fuel enrichment may be made in response to an operating condition of the particulate filter. For example, as a particulate filter begins to regenerate it will consume oxygen in the exhaust gas stream. As the regeneration continues, less oxygen may be consumed from the exhaust gas stream because less particulate matter is being oxidized. Accordingly, the amount of excess oxygen in the exhaust gas can be adjusted by enriching or leaning the cylinder air-fuel mixture. For example, if an oxygen sensor located downstream of a particulate filter indicates an excess oxygen concentration in the exhaust gases while a particulate filter is being regenerated, a cylinder air-fuel mixture can be richened to reduce the excess oxygen. If an oxygen sensor located downstream of a particulate filter indicates a low oxygen concentration in the exhaust gases while a particulate filter is being regenerated, a cylinder air-fuel mixture can be leaned to increase the excess oxygen.

It should be noted that intake valve timing and exhaust valve timing along with intake manifold pressure and exhaust manifold pressure may be used to infer an amount of air that passes through a cylinder without participating in combustion. In one example, a table or function of empirically determined air amounts may be indexed by intake and exhaust valve timing and by intake and exhaust manifold pressures. The amount of air that flows from the intake system to the exhaust system during a cylinder cycle may be subtracted from an amount of air that flowed into the cylinder during the cylinder cycle such that the amount of air held in the cylinder during a cylinder cycle for a combustion event may be determined. Routine 500 then proceeds to 512.

At 512, routine 500 determines if the exhaust gas oxygen concentration may be at a desired level. If so routine 500 proceeds to 514. If not, routine 500 proceeds to 506. In one embodiment, the exhaust gas may be controlled to a desired oxygen concentration. For example, the valve timing for valve overlap or the amount of fuel injected to a cylinder can be adjusted based on an oxygen concentration sensed by an oxygen sensor. If the exhaust oxygen concentration is higher or lower than desired, the boost pressure and cam timing can be adjusted at 506. For example, if the oxygen concentration sensed in the exhaust system is higher than desired, the amount of valve overlap and boost pressure may be reduced. If the oxygen concentration sensed in the exhaust system is lower than desired, the amount of valve overlap and boost pressure may be increased. In one embodiment, when the exhaust oxygen concentration may be lower than desired for particulate filter regeneration, the amount of boost may be increased. In another embodiment, when the exhaust oxygen concentration may be lower than desired for particulate filter regeneration, the amount of intake and exhaust valve overlap may be increased. In another embodiment, when the exhaust oxygen concentration may be higher than desired for particulate filter regeneration, the amount of boost may be decreased. In another embodiment, when the exhaust oxygen concentration may be higher than desired for particulate filter regeneration, the amount of intake and exhaust valve overlap may be decreased.

At 514, the routine judges whether or not regeneration of the particulate filter may be complete or if conditions for regeneration are no longer present. In one embodiment, regeneration may be determined complete when the pressure difference across the particulate filter is less than a predetermined amount. In another example, regeneration may be determined as complete when the exhaust gas downstream of the particulate filter indicates an increase in oxygen concentration in exhaust gases that pass through the particulate filter. The increased oxygen concentration may be an indicator that soot in the filter has been oxidized and that the amount of soot is reduced such that less oxygen is consumed to oxidize soot remaining in the filter. If routine 500 judges that regeneration may be complete, routine 500 proceeds to 516. Otherwise, routine 500 stays at 514 until regeneration may be complete.

At 516, actuators that adjust boost pressure, cam timing, and throttle are returned to the base values that are based on engine operating conditions. In one example, the exhaust valve overlap may be decreased when particulate filter regeneration is complete. In addition, rich bias is removed from cylinder fueling so that engine cylinders operate on a near stoichiometric air-fuel mixture. Routine 500 then proceeds to exit.

In this way, the method of FIG. 5 provides for a first engine valve timing in response to a first condition of a particulate filter, and a second engine valve timing in response to a second condition of a particulate filter, the second valve timing allowing for flowing more gases through the intake system to the exhaust system without having the gases participate in a combustion event before flowing to the exhaust system from the intake system. Further, the method of FIG. 5 can control the amount of valve overlap in response to one or more oxygen sensors located in the exhaust system. For example, if the amount of oxygen downstream of a particulate filter increases beyond a desired amount, the amount of valve overlap may be decreased. On the other hand, if the amount of oxygen downstream of a particulate filter decreases beyond a desired amount, the amount of valve overlap may be increased. As discussed above, valve overlap may be increased or decreased by adjusting timing of intake and exhaust camshafts relative to the crankshaft. In one embodiment, the oxygen sensor may be located in the exhaust system upstream of a particulate filter. In another embodiment, the oxygen sensor is located downstream of the particulate filter. If a configuration is selected that has an oxygen sensor located downstream of the particulate filter, the oxygen sensor can detect the oxidation of soot by sensing less oxygen in the exhaust gases. As an alternative, a model may be used in place of an oxygen sensor, if desired.

It will be appreciated that the configurations and routines disclosed herein are exemplary in nature, and that these specific embodiments are not to be considered in a limiting sense, because numerous variations are possible. For example, the above approaches can be applied to V-6, I-4, I-6, V-12, opposed 4, and other engine types.

The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for regenerating a particulate filter, comprising:
operating a direct injection gasoline engine having intake and exhaust systems to combust a substantially stoichiometric air-fuel mixture while regenerating the particulate filter;
flowing gases from said intake system to said exhaust system at a location upstream of said particulate filter and downstream of a three-way catalyst for the regeneration, while simultaneously flowing gases from a location downstream of said particulate filter to said intake system; and
adjusting boost pressure in response to at least a state of particulate filter regeneration.

2. The method of claim 1, further comprising increasing boost pressure during regeneration of said particulate filter.

3. The method of claim 2, further comprising decreasing boost pressure as a pressure drop across said particulate filter is reduced during regeneration of said particulate filter.

4. The method of claim 2, further comprising controlling an amount of said gases flowing from said intake system to said exhaust system in response to an oxygen sensor located upstream or downstream of said particulate filter.

5. A method for regenerating a particulate filter, comprising:
operating an engine having intake and exhaust systems, at least one cylinder of said engine combusting a substantially stoichiometric air-fuel mixture; and
flowing gases from said intake system to said exhaust system at a location upstream of said particulate filter and downstream of a catalyst, while simultaneously flowing gases from a location downstream of said particulate filter to said intake system.

6. The method of claim 5, wherein said gases flowing from said intake system to said exhaust system are compressed by a compressor and routed from said intake system to said exhaust system by way of a valve.

7. The method of claim 5, wherein said gases flowing from said location downstream of said particulate filter to said intake system flow to an inlet side of a compressor located within said intake system.

8. The method of claim 6, wherein a flow rate of said gases flowing from said intake system to said exhaust system is regulated by a position of said valve.

9. The method of claim 6, further comprising adjusting a position of said valve in response to an oxygen sensor located downstream of said particulate filter.

10. The method of claim 5, wherein said particulate filter includes a wash coat comprising at least one of platinum, palladium, or rhodium.

11. The method of claim 5, wherein gases flow from said intake system to said exhaust system at engine loads greater than 0.3 engine load.

12. The method of claim 5, wherein said engine is a direct injection gasoline engine.

13. The method of claim 5, further comprising inhibiting flow of gases from said intake system to said exhaust system in response to an oxygen sensor located downstream of said particulate filter.

14. The method of claim 5, further comprising limiting flow of said gases from said intake system to said exhaust system in response to a threshold temperature.

15. The method of claim 14, wherein said threshold temperature is at least one of a temperature of said engine or a temperature of said particulate filter.

16. The method of claim 6, wherein said compressor is a turbocharger compressor or a supercharger compressor.

17. The method of claim 16, wherein an output pressure of said turbocharger compressor or of said supercharger compressor is adjusted in response to a driver demand torque.

18. A method for regenerating a particulate filter, comprising:
operating a direct injection gasoline engine having an intake system and an exhaust system, at least one cylinder of said direct injection gasoline engine combusting a substantially stoichiometric or rich air-fuel mixture;
processing exhaust from said at least one cylinder by a three-way catalyst, said three-way catalyst located upstream of said particulate filter, said three-way catalyst and said particulate filter disposed in said exhaust system; and
flowing intake system gases from said intake system to said exhaust system at a location upstream of said particulate filter and downstream of said three-way catalyst, while simultaneously flowing exhaust gases from a location downstream of said particulate filter to said intake system, and flowing said intake system gases from said intake system to said exhaust system in response to a condition of said particulate filter.

19. The method of claim 18, wherein said condition of said particulate filter is an amount of pressure drop across said particulate filter.

20. The method of claim 18, further comprising modulating said substantially stoichiometric or rich air-fuel mixture in response to an oxygen sensor disposed in said exhaust system at a location downstream of said particulate filter.

* * * * *